United States Patent [19]
Putnam, Jr.

[11] Patent Number: 5,836,630
[45] Date of Patent: *Nov. 17, 1998

[54] POSTHOLE DIGGER AND CLEANING ATTACHMENT

[76] Inventor: Ronald Glenn Putnam, Jr., 15031 Beatties Ford Rd., Huntersville, N.C. 28078

[ * ] Notice: The term of this patent shall not extend beyond the expiration date of Pat. No. 5,685,587.

[21] Appl. No.: 966,625

[22] Filed: Nov. 10, 1997

Related U.S. Application Data

[63] Continuation-in-part of Ser. No. 613,840, Mar. 11, 1996, Pat. No. 5,685,587.

[51] Int. Cl.⁶ ............................................. A01B 1/18
[52] U.S. Cl. .................. 294/50.5; 294/50.8; 294/60
[58] Field of Search .................. 294/49, 50, 50.5, 294/50.6, 50.7, 50.8, 50.9, 59, 60; 111/101, 106, 107

[56] References Cited

U.S. PATENT DOCUMENTS

| | | | |
|---|---|---|---|
| 541,841 | 7/1895 | Doyle | 294/50.5 |
| 669,841 | 3/1901 | Koeth | 294/50.5 |
| 1,407,232 | 2/1922 | Stevens . | |
| 1,486,755 | 3/1924 | Ingersoll . | |
| 1,501,965 | 7/1924 | Moors | 294/50.5 |
| 1,539,088 | 5/1925 | Jones | 294/50.5 |
| 1,592,270 | 7/1926 | Johnson . | |
| 2,036,433 | 4/1936 | Nisewanger | 294/50.5 |
| 2,598,288 | 5/1952 | Navarre . | |
| 3,152,788 | 10/1964 | Hardwidge . | |
| 3,319,988 | 5/1967 | Smith . | |
| 3,608,644 | 9/1971 | Anbrose . | |
| 4,630,366 | 12/1986 | Fry . | |
| 4,807,625 | 2/1989 | Singleton . | |
| 5,685,587 | 11/1997 | Putnam, Jr. | 294/50.8 |

*Primary Examiner*—Dean Kramer
*Attorney, Agent, or Firm*—Adams Law Firm, P.A.

[57] ABSTRACT

A posthole digger has first and second spaced-apart, substantially upright, pivotably attached handles. First and second cooperating scoops extend from respective proximal ends of the handles. The scoops are moveable between a generally open position for penetrating the ground surface, and a generally closed position for excavating. A cleaning attachment includes a stationary hollow sleeve attached adjacent the proximal ends of the handles. An elongate slide rod is received within the sleeve and extends between the handles for sliding vertical movement relative to the handles. An inner scraper is attached to an end of the slide rod, and is positioned between the first and second scoops. A spring engages the slide rod and normally urges the inner scraper upwardly into a storage position adjacent a top end of the scoops. A foot extension is formed with the inner scraper and is depressed by the foot of a user against the force of the spring to move the inner scraper downwardly along the length of the scoops. An outer scraper is secured to the foot extension and resides in closely-spaced relation to an outside surface of the scoops. The outer scraper is movable in unison with the inner scraper to clean away accumulated earthen matter from inside and outside surfaces of the scoops in the open position.

19 Claims, 8 Drawing Sheets

POSTHOLE DIGGER AND CLEANING ATTACHMENT

TECHNICAL FIELD AND BACKGROUND OF THE INVENTION

This application is continuation-in-part of Ser. No. 08/613,840, filed Mar. 11, 1996, now U.S. Pat. No. 5,685,587, issued on Nov. 11, 1997. The invention relates to a posthole digger with a cleaning attachment for removing accumulated earthen matter adhering to the scoops of the digger during use.

The invention further relates to a method of cleaning a posthole digger. The cleaning attachment is readily adapted for use on existing posthole diggers, and is conveniently removable for repair or replacement as needed. The invention is durable, relatively inexpensive to manufacture, and requires little maintenance.

One post hole digger of the prior art, and disclosed in U.S. Pat. No. 2,598,288, includes a vertically movable inside scraper plate located between opposing scoops of the digger. The scraper plate is attached to an elongated plunger rod extending between the handles, and slidably received within a stationary guide. The guide is located at a pivot point pivotably connecting the handles together slightly above the scoops. A coil spring surrounds the plunger rod and acts to normally urge the scraper plate upwardly into a raised, inoperative position with the plunger rod extending vertically between the handles.

To actuate the scraper plate from its raised position, the user firmly grasps the handles of the digger and depresses a foot pedal attached to the top end of the plunger rod. The scraper plate moves downwardly against the force of spring to engage and remove any accumulated earthen matter adhering to the inside surface of the scoops. When the scraper plate reaches the lower end of the scoops, the user releases his foot from the foot pedal and the spring automatically returns the scraper plate to its raised inoperative position.

Although providing an improvement over conventional diggers without cleaning attachments, the posthole digger of the '288 patent suffers from drawbacks and limitations. One drawback relates to the attachment of the foot pedal to the free end of the elongated plunger rod. When the inner scraper plate is in its raised position, the foot pedal is located a substantial vertically-spaced distance above the scoops. The user must display exceptional balance and coordination to properly actuate the inside scraper plate in the intended manner, particularly when attempting to remove compacted mud and clay from the scoops. Moreover, due to the force applied by the foot of the user on the foot pedal, the plunger rod is likely to be bent or otherwise damaged over a relatively short period of use.

The present invention overcomes these and other such problems of the prior art by providing a posthole digger with an effective and easy to operate cleaning attachment. The cleaning attachment of the present invention is actuated by the foot of the user directly on the scraper assembly itself. The cleaning attachment will not be readily damaged. Furthermore, the invention provides means for simultaneously cleaning both the inside and outside surfaces of the scoops during use of the posthole digger.

SUMMARY OF THE INVENTION

Therefore, it is an object of the invention to provide a posthole digger with a cleaning attachment for easily removing accumulated earthen matter adhering to the scoops of the digger during use.

It is another object of the invention to provide a cleaning attachment that is conveniently retrofitted onto existing, conventional posthole diggers.

It is another object of the invention to provide a posthole digger including a cleaning attachment capable of simultaneously cleaning both inside and outside surfaces of the scoops during use.

It is another object of the invention to provide a posthole digger including a cleaning attachment that is relatively inexpensive to manufacture.

It is another object of the invention to provide a posthole digger including a cleaning attachment that is easily removable for repair or replacement as needed.

It is another object of the invention to provide a posthole digger including a cleaning attachment that is durable, and requires little maintenance.

It is another object of the invention to provide a posthole digger including a cleaning attachment which has resilient wipers for wiping away earthen matter adhering directly to the inside and outside surfaces of the scoops.

It is another object of the invention to provide a method of simultaneously cleaning the inside and outside surfaces of the scoops of the posthole digger.

These and other objects of the present invention are achieved in the preferred embodiments disclosed below by providing a posthole digger having first and second spaced-apart and substantially upright handles. Each handle has a free end and a proximal end. Pivot means pivotably attaches the handles together adjacent their respective proximal ends. First and second cooperating scoops extend from the handles and are attached to their respective proximal ends. The scoops are moveable between a generally open position for penetrating the ground surface, and a generally closed position for excavating.

The improvement is a cleaning attachment for removing accumulated earthen matter from the first and second scoops when in the open position. The cleaning attachment includes a stationary hollow sleeve attached adjacent respective proximal ends of the handles. An elongate slide rod is received within the sleeve and extends between the handles for sliding vertical movement relative to the handles. An inner scraper is attached to an end of the slide rod, and is positioned between the first and second scoops for reciprocating vertical movement along the length of the scoops when in the open position. Biasing means engages the slide rod for normally urging the inner scraper upwardly into a storage position adjacent a top end of the scoops. A foot extension is secured to the inner scraper for being depressed by the foot of a user against the force of the biasing means to move the inner scraper downwardly along the length of the scoops from their top end to their bottom end. An outer scraper is secured to the foot extension and resides in closely-spaced relation to an outside surface of the scoops. The outer scraper is movable in unison with the inner scraper to clean away accumulated earthen matter from inside and outside surfaces of the scoops in the open position.

According to one preferred embodiment of the invention, the inner scraper includes a scraper plate having opposing perimeter edges residing in closely spaced relation to respective scoops in the open position. The inner scraper plate is moved vertically along the length of the scoops to clean away accumulated earthen matter from the inside surface of the scoops.

According to another preferred embodiment of the invention, the foot extension includes an outward-extending flange integrally formed with the scraper plate, and located on one side of the posthole digger for ready access by the user.

According to yet another preferred embodiment of the invention, a second outward-extending flange is integrally formed with the scraper plate, and located on an opposite side of the posthole digger.

According to yet another preferred embodiment of the invention, the biasing means includes a spring carried by the slide rod, and extending between a top end of the slide rod and the sleeve for normally urging the inner scraper upwardly into the storage position.

According to yet another preferred embodiment of the invention, the outer scraper includes a scraper ring attached to the foot extension, and extending in a generally circular path around the outside surface of the scoops.

In another embodiment, a posthole digger includes first and second spaced-apart and substantially upright handles. Each handle has a free end and a proximal end. Pivot means pivotably attaches the handles together adjacent their respective proximal ends. First and second cooperating scoops extend from the handles, and are attached to respective proximal ends of the handles. The scoops are moveable between a generally open position for penetrating the ground surface, and a generally closed position for excavating.

The improvement is a cleaning attachment for removing accumulated earthen matter from the first and second scoops when in the open position. The cleaning attachment includes first and second, stationary hollow sleeves attached together and residing adjacent respective proximal ends of the handles. First and second elongate slide rods are received within respective sleeves and extend between the handles for unison, sliding vertical movement relative to the handles. An inner scraper is attached to respective ends of the slide rods, and is positioned between the first and second scoops for reciprocating vertical movement along the length of the scoops when in the open position. Biasing means engage the first and second slide rods for normally urging the inner scraper upwardly into a storage position adjacent a top end of the scoops. A foot extension is secured to the inner scraper for being depressed by the foot of a user against the force of the biasing means to move the inner scraper downwardly along the length of the scoops from their top end to their bottom end. An outer scraper is secured to the foot extension, and resides in closely-spaced relation to an outside surface of the scoops. The outer scraper is movable in unison with the inner scraper to clean away accumulated earthen matter from inside and outside surfaces of the scoops in the open position.

The invention further includes a method of cleaning a posthole digger having opposed, cooperating scoops moveable between a generally open position for penetrating the ground surface, and a generally closed position for excavating. The method includes the steps of providing a scraper assembly including an inner scraper residing between the opposed scoops of the posthole digger adjacent an inside surface of the scoops, and an outer scraper extending adjacent an outside surface of the scoops. The scraper assembly is then located in a pre-cleaning, storage position adjacent a top end of the scoops. Then, with the scoops in the open position, the scraper assembly is moved from the storage position downwardly along the length of the scoops to a cleaning position adjacent a bottom end of the scoops, thus simultaneously cleaning away earthen matter adhering to the inside and outside surfaces of the scoops.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
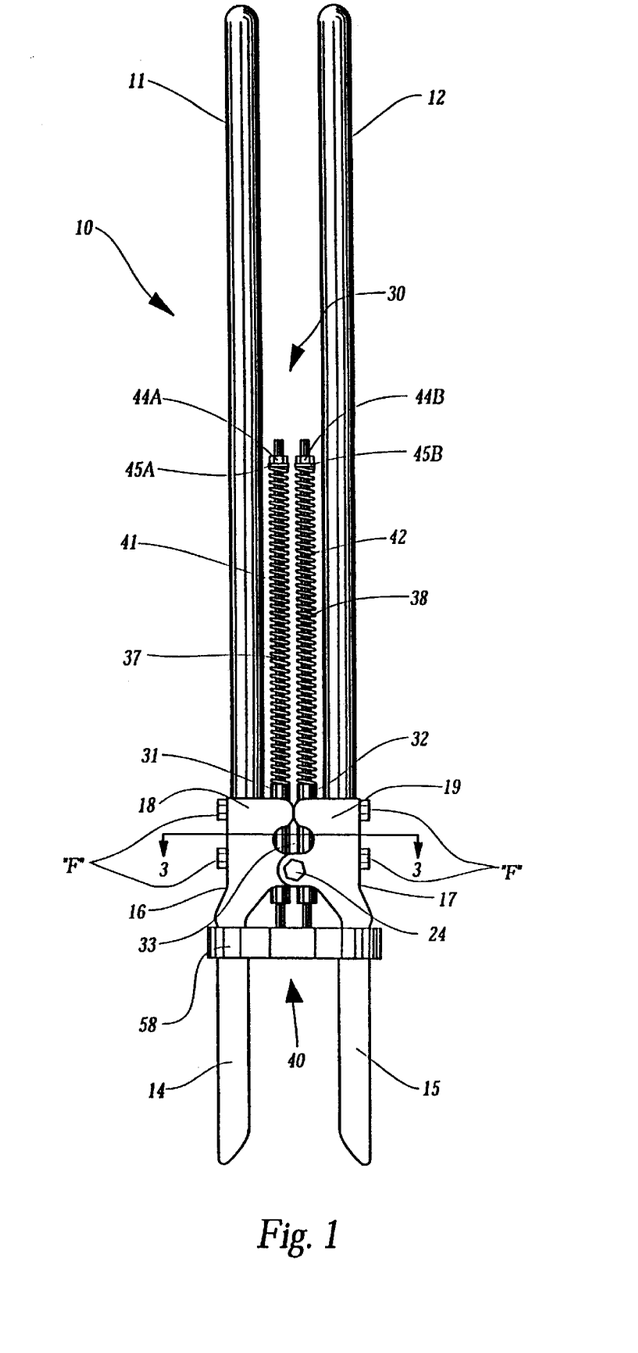
FIG. 1 is a front elevational view of the posthole digger with a cleaning attachment according to one preferred embodiment of the invention.

Referring now specifically to the drawings, a posthole digger according to the present invention is illustrated in FIG. 1 and shown generally at reference numeral 10. The posthole digger 10 is used in a conventional manner to dig holes for fence posts, deck supports, and other structures set into the ground.

Figure 2:
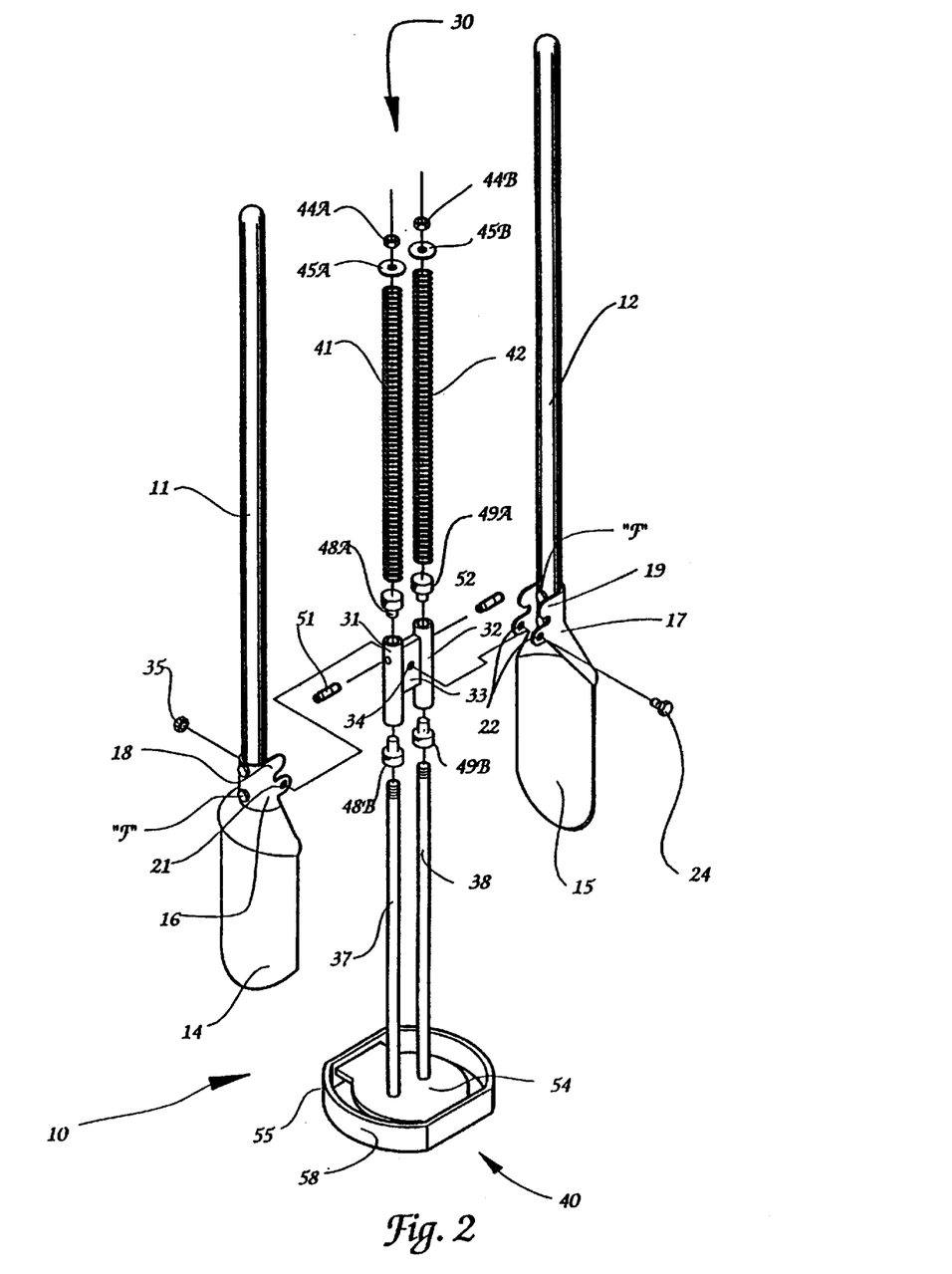
FIG. 2 is an exploded perspective view of the posthole digger and cleaning attachment.

The posthole digger 10 includes first and second substantially upright handles 11 and 12 for being gripped and manipulated by a user at respective free ends. Cooperating scoops 14 and 15 depend from proximal ends of the handles 11 and 12, and include respective connecting portions 16 and 17 which receive fasteners "F" therethrough to connect the scoops 14, 15 to the handles 11, 12. The connecting portions 16, 17 include respective pairs of spaced flanges 18 and 19 with openings 21 and 22, as best shown in FIG. 2, aligned to receive a threaded pivot bolt 24. The pivot bolt 24 pivotably joins the handles 11, 12 together, and permits pivoting movement of the scoops 14, 15 between a generally open position (See FIG. 1) for penetrating the ground surface and a generally closed position (See FIG. 4) for excavating.

Referring to FIGS. 1 and 2, a cleaning attachment 30 is located between the handles 11, 12 and scoops 14, 15 for dislodging earthen matter adhering to the inside and outside surfaces of the scoops 14, 15 during use of the posthole digger 10. The cleaning attachment 30 includes spaced, hollow stationary sleeves 31 and 32 formed together with a spacer 33. The spacer 33 has an opening 34 for being aligned with openings 21, 22 of the flanges 18, 19, and receiving the pivot bolt 24 therethrough to locate the sleeves 31, 32 in an area between the connecting portions 16, 17 of respective scoops 14, 15. The pivot bolt 24 is inserted through the aligned openings 21, 22, and 34, and a threaded nut 35 applied to its free end to hold the bolt 24 in position.

First and second elongated slide rods 37 and 38 are attached to a scraper assembly 40, and received upwardly through the hollow sleeves 31, 32 to locate the scraper assembly 40 in a raised position shown in FIG. 1. The scraper assembly 40 is normally maintained in this position by coil springs 41 and 42 surrounding respective slide rods 37, 38. The coil springs 41 and 42 bear against pairs of nuts 44A, 44B and washers 45A, 45B at free ends of the slide rods 37, 38 and against the hollow sleeves 31, 32 supported by the pivot bolt 24. Preferably, the slide rods 37, 38 and nuts 44A, 44B have complementary screw threads for allowing convenient assembly and disassembly of the cleaning attachment 30. In addition, hollow nylon seals 48A, 48B and 49A, 49B, shown in FIG. 2, are preferably located at respective openings of the sleeves 31, 32 to prevent loose dirt and other debris from entering the sleeves 31, 32 and impairing sliding movement of the slide rods 37, 38. Standard grease fittings 51 and 52 may also be provided for injecting a lubricating fluid into the sleeves 31 and 32 to lubricate the slide rods 37, 38 as needed.

Figure 3:
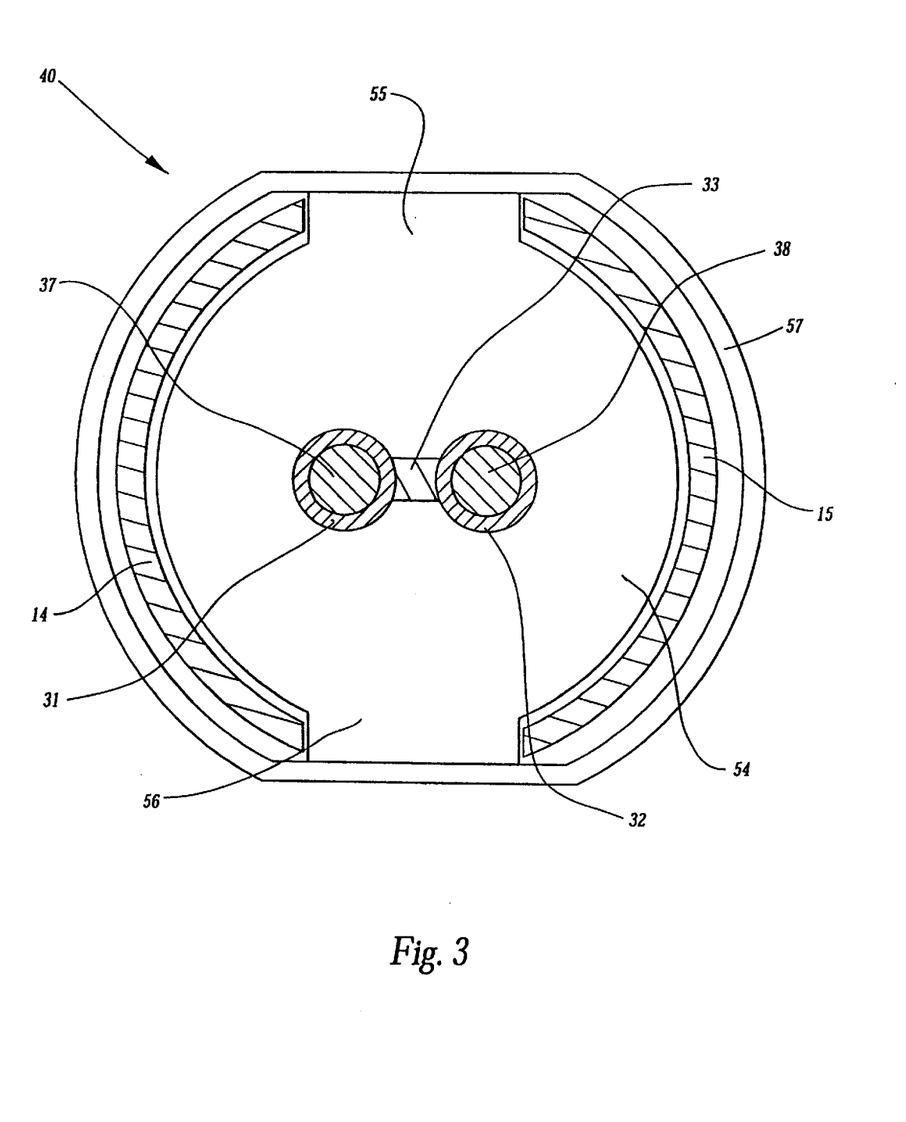
FIG. 3 is a cross-sectional view taken substantially along line 3—3 of FIG. 1.

As best shown in FIGS. 2 and 3, the scraper assembly 40 includes an inner scraper plate 54 located between the scoops 14, 15, and including opposing, integrally-formed side flanges 55 and 56 defining respective foot extensions. The inner scraper plate 54 resides in closely spaced relation to the inside surface of the scoops 14, 15, and is movable along the length of the scoops 14, 15 in their open position shown in FIG. 1. An outer ring 58 is attached to the side flanges 55,56 and extends around the outside of the scoops 14, 15 in closely spaced relation to the outside surface of the scoops 14, 15. The side flanges 55, 56 and outer ling 58 provide sufficient surface area for supporting the foot of the user as the scraper assembly 40 is pushed downwardly along the length of the scoops 14, 15.

Operation of the Posthole Digger 10

Figure 4:
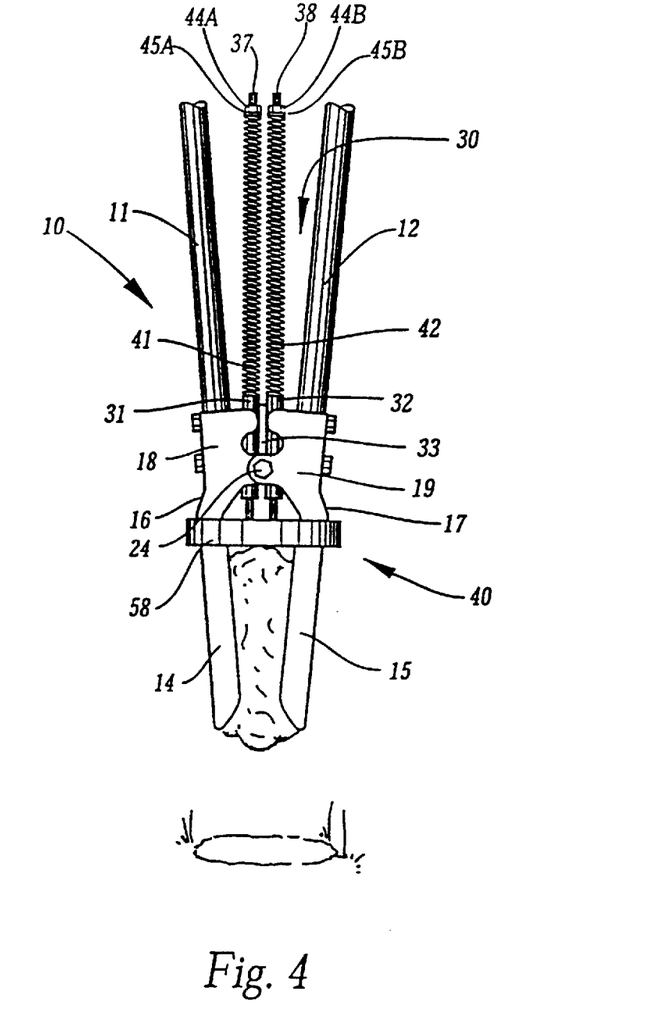
FIGS. 4, 5, and 6 are sequential views illustrating operation of the posthole digger and cleaning attachment.
Figure 5:
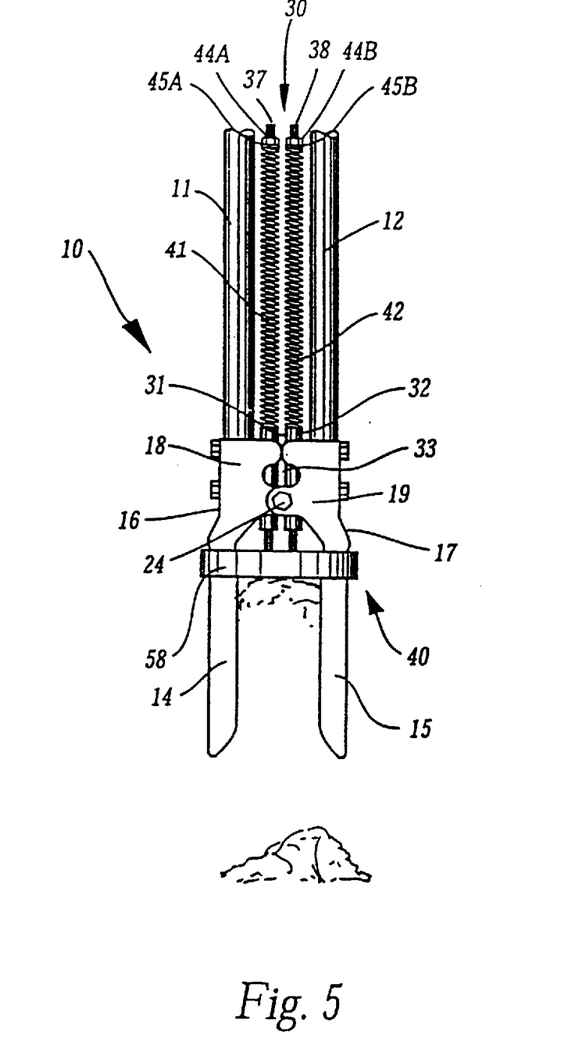
Figure 6:
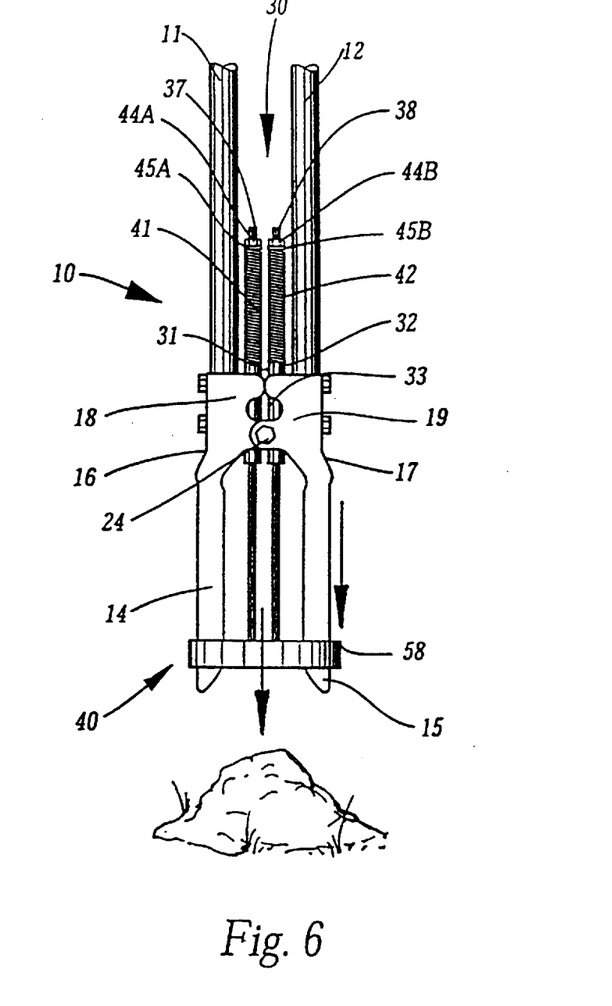

Operation of the posthole digger 10 with the cleaning attachment 30 is illustrated sequentially in FIGS. 4, 5, and 6. The posthole digger 10 is driven into the ground and the scoops 14, 15 closed to excavate earthen matter, as shown in FIG. 4. The posthole digger 10 is then moved away from the resulting hole, and the scoops 14, 15 pivoted into the open position to drop any loose earthen matter. As shown in FIG. 5, a portion of the excavated earthen matter generally accumulates in an upper area of the scoops 14, 15, adhering to both the inside and outside surfaces of the scoops 14, 15.

To remove the earthen matter, the user places his foot directly onto the outer ring 58 and one of the opposing side flanges 55 or 56 and depresses the scraper assembly 40 against the biasing force of the coil springs 41, 42. As shown in FIG. 6, as the scraper assembly 40 moves downwardly along the length of the scoops 14, 15, the inner scraper plate 54 and outer ling 58 cooperate to simultaneously clean away earthen matter adhering to the inside and outside surfaces of the scoops 14 and 15. For added cleaning, pairs of resilient wipers (not shown) may be formed around the perimeter of the inner scraper plate 54 and outer ling 58, respectively, for engaging the inside and outside surfaces of the scoops 14 and 15 upon actuation of the scraper assembly 40. The wipers are preferably formed of a hard plastic, such as UHMW, rubber, or "Teflon".

Once cleaned, the user releases his foot from the outer ring 58 and side flange 55 or 56, and the springs 41, 42 return the scraper assembly 40 upwardly to its raised position. The cleaning attachment 30 does not interfere with normal operation of the posthole digger 10, and is usable only when desired to dean adhering mud and other earthen matter from the scoops 14, 15.

Figure 7:
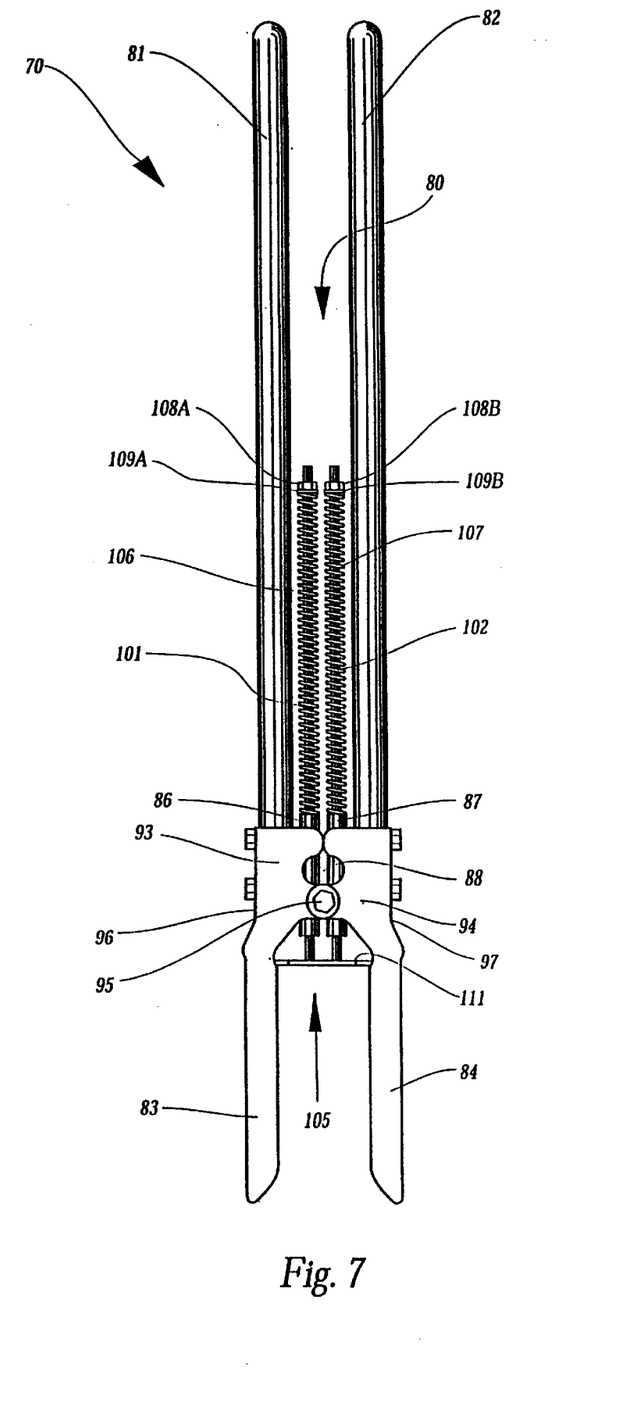
FIG. 7 is a front elevational view of the posthole digger with a cleaning attachment according to a second preferred embodiment of the invention.
Figure 8:
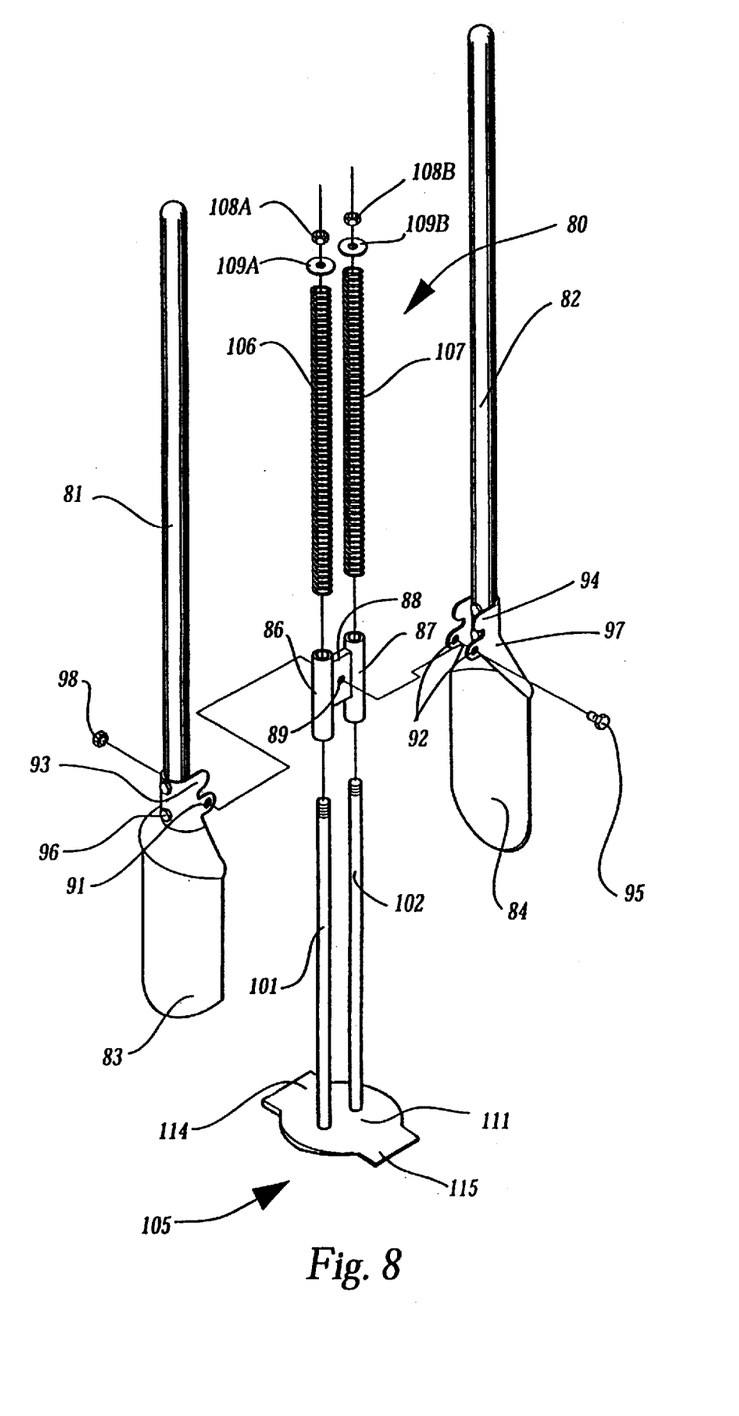
FIG. 8 is an exploded perspective view of the posthole digger and cleaning attachment shown in FIG. 7.

An alternative embodiment of a posthole digger 70 according to the present invention is shown in FIGS. 7, 8 and 9. The posthole digger 70 includes a cleaning attachment 80 located between the handles 81 and 82 and scoops 83 and 84 for dislodging earthen matter adhering to the inside surface of the scoops 83, 84 during use.

The cleaning attachment 80 includes spaced, hollow stationary sleeves 86 and 87 formed together with a spacer 88. The spacer 88 has an opening 89 for being aligned with openings 91 and 92 of flanges 93 and 94, and for receiving a pivot bolt 95 therethrough to locate the sleeves 86, 87 in an area between the connecting portions 96 and 97 of respective scoops 83, 84. The pivot bolt 95 is inserted through the aligned openings 89, 91, and 92, and a threaded nut 98 applied to its free end to hold the bolt 95 in position.

First and second elongate slide rods 101 and 102 are attached to a scraper assembly 105, and received upwardly through the hollow sleeves 86, 87 to locate the scraper assembly 105 in a raised position shown in FIG. 7. The scraper assembly 105 is normally maintained in this position by coil springs 106 and 107 surrounding respective slide rods 101, 102. The coil springs 106, 107 bear against pairs of nuts 108A, 108B and washers 109A, 109B at free ends of the slide rods 101, 102 and against the hollow sleeves 86, 87 supported by the pivot bolt 95. Preferably, the slide rods 101, 102 and nuts 108A, 108B have complementary screw threads for allowing convenient assembly and disassembly of the cleaning attachment 70.

The scraper assembly 105 includes an inner scraper plate 111 located between the scoops 83, 84 and having opposing, integrally-formed side flanges 114 and 115. The inner scraper plate 111 resides in closely spaced relation to the inside surface of the scoops 83, 84, and is movable along the length of the scoops 83, 84 when in their open position to remove earthen matter adhering to the inside surface of the scoops 83, 84 in the manner described above. The side flanges 114, 115 provide sufficient surface area for directly supporting the foot of the user as the scraper assembly 105 is pushed downwardly along the length of the scoops 83, 84.

In a further embodiment (not shown), the cleaning attachment of the posthole digger includes only a single hollow sleeve, slide rod, and spring. The sleeve may be welded directly to the pivot bolt used for pivotably connecting the handles together.

A posthole digger is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In a posthole digger comprising first and second spaced-apart and substantially upright handles, each handle having a free end thereof and a proximal end thereof, pivot means for pivotably attaching the handles together, and first and second cooperating scoops extending from respective proximal ends of the handles, the scoops being moveable between a generally open position for penetrating the ground surface, and a generally closed position for excavating, the improvement comprising a cleaning attachment for removing accumulated earthen matter from the first and second scoops when in the open position, said cleaning attachment comprising:

(a) a stationary hollow sleeve attached adjacent the proximal ends of the handles;

(b) an elongate slide rod received within the sleeve and extending between the handles for sliding vertical movement relative thereto;

(c) an inner scraper attached to an end of said slide rod and positioned between the first and second scoops for reciprocating vertical movement along the length of the scoops when in the open position;

(d) biasing means engaging the slide rod for normally urging the inner scraper upwardly into a storage position adjacent a top end of the scoops;

(e) a foot extension secured to said inner scraper for being depressed by the foot of a user against the force of said biasing means to move said inner scraper downwardly along the length of said scoops from the top end thereof to a bottom end thereof; and (f) an outer scraper secured to said foot extension and residing in closely-spaced relation to an outside surface of the scoops, said outer scraper being movable in unison with said inner scraper to clean away accumulated earthen matter from inside and outside surfaces of the scoops in the open position.

2. A posthole digger according to claim 1, wherein said inner scraper comprises a scraper plate having opposing perimeter edges residing in closely spaced relation to respective scoops in the open position, and for being moved vertically along the length of the scoops to clean away accumulated earthen matter from the inside surface of the scoops.

3. A posthole digger according to claim 2, wherein said foot extension comprises an outward-extending flange integrally formed with said scraper plate, and located on one side of the posthole digger for ready access by the user.

4. A posthole digger according to claim 3, and comprising a second outward-extending flange integrally formed with said scraper plate, and located on an opposite side of the posthole digger.

5. A posthole digger according to claim 1, wherein said biasing means comprises a spring carried by the slide rod, and extending between a top end of the slide rod and the sleeve for normally urging the inner scraper upwardly into the storage position.

6. A posthole digger according to claim 1, wherein said outer scraper comprises a scraper ring attached to the foot extension, and extending in a generally circular path around the outside surface of the scoops.

7. In a posthole digger comprising first and second spaced-apart and substantially upright handles, each handle having a free end thereof and a proximal end thereof, pivot means for pivotably attaching the handles together, and first and second cooperating scoops extending from respective proximal ends of the handles, the scoops being moveable between a generally open position for penetrating the ground surface, and a generally closed position for excavating, the improvement comprising a cleaning attachment for removing accumulated earthen matter from the first and second scoops when in the open position, said cleaning attachment comprising:

(a) first and second, stationary hollow sleeves attached together and residing adjacent the proximal ends of the handles;

(b) first and second elongate slide rods received within respective sleeves and extending between the handles for unison, sliding vertical movement relative thereto;

(c) an inner scraper attached to respective ends of said slide rods and positioned between the first and second scoops for reciprocating vertical movement along the length of the scoops when in the open position;

(d) biasing means engaging the first and second slide rods for normally urging the inner scraper upwardly into a storage position adjacent a top end of the scoops; and (e) a foot extension secured to said inner scraper for being depressed by the foot of a user against the force of said biasing means to move said inner scraper downwardly along the length of said scoops from the top end thereof to a bottom end thereof; and (f) an outer scraper secured to said foot extension and residing in closely-spaced relation to an outside surface of the scoops, said outer scraper being movable in unison with said inner scraper to clean away accumulated earthen matter from inside and outside surfaces of the scoops in the open position.

8. A posthole digger according to claim 7, wherein said inner scraper comprises a scraper plate having opposing perimeter edges residing in closely spaced relation to respective scoops in the open position, and for being moved vertically along the length of the scoops to clean away accumulated earthen matter from the inside surface of the scoops.

9. A posthole digger according to claim 8, wherein said foot extension comprises an outward-extending flange integrally formed with said scraper plate, and located on one side of the posthole digger for ready access by the user.

10. A posthole digger according to claim 9, and comprising a second outward-extending flange integrally formed with said scraper plate, and located on an opposite side of the posthole digger.

11. A posthole digger according to claim 10, and comprising an outer scraper ring attached to the first and second outward-extending flanges, and extending in a generally circular path around the outside surface of the scoops.

12. A posthole digger according to claim 7, wherein said outer scraper comprises an outer scraper ring secured to the foot extension, and extending in a generally circular path around the outside surface of the scoops.

13. A cleaning attachment for use in a posthole digger comprising first and second spaced-apart and substantially upright handles, each handle having a free end thereof and a proximal end thereof, pivot means for pivotably attaching the handles together, and first and second cooperating scoops extending from respective proximal ends of the handles, the scoops being moveable between a generally open position for penetrating the ground surface, and a generally closed position for excavating, the improvement comprising a cleaning attachment for removing accumulated earthen matter from the first and second scoops when in the open position, said cleaning attachment comprising:

(a) a stationary hollow sleeve attached adjacent the proximal ends of the handles;

(b) an elongate slide rod received within the sleeve and extending between the handles for sliding vertical movement relative thereto;

(c) an inner scraper attached to an end of said slide rod and positioned between the first and second scoops for reciprocating vertical movement along the length of the scoops when in the open position;

(d) biasing means engaging the slide rod for normally urging the inner scraper upwardly into a storage position adjacent to a top end of the scoops;

(e) a foot extension secured to said inner scraper for being depressed by the foot of a user against the force of said biasing means to move said inner scraper downwardly along the length of said scoops from the top end thereof to a bottom end thereof; and (f) an outer scraper secured to said foot extension and residing in closely-spaced relation to an outside surface of the scoops, said outer scraper being movable in unison with said inner scraper to clean away accumulated earthen matter from inside and outside surfaces of the scoops in the open position.

14. A cleaning attachment according to claim 13, wherein said inner scraper comprises a scraper plate having opposing perimeter edges for residing in closely spaced relation to respective scoops in the open position, and for being moved vertically along the length of the scoops to clean away accumulated earthen matter from the inside surface of the scoops.

15. A cleaning attachment according to claim 14, wherein said foot extension comprises an outward-extending flange integrally formed with said scraper plate, and located on one side of the posthole digger for ready access by the user.

16. A cleaning attachment according to claim 15, and comprising a second outward-extending flange integrally formed with said scraper plate, and located on an opposite side of the posthole digger.

17. A cleaning attachment according to claim 13, wherein said biasing means comprises a spring carried by the slide rod, and extending between a top end of the slide rod and the sleeve for normally urging the inner scraper upwardly into the storage position.

18. A posthole digger according to claim 13, wherein said outer scraper comprises a scraper ling attached to the foot extension, and extending in a generally circular path around the outside surface of the scoops.

19. In a posthole digger comprising first and second spaced-apart and substantially upright handles, each handle having a free end thereof and a proximal end thereof, pivot means for pivotably attaching the handles together, and first and second cooperating scoops extending from respective proximal ends of the handles, the scoops being moveable between a generally open position for penetrating the ground surface, and a generally closed position for excavating, the improvement comprising a cleaning attachment for removing accumulated earthen matter from the first and second scoops when in the open position, said cleaning attachment comprising:

(a) a stationary hollow sleeve attached adjacent the proximal ends of the handles;

(b) an elongate slide rod received within the sleeve and extending between the handles for sliding vertical movement relative thereto;

(c) an inner scraper attached to an end of said slide rod and positioned between the first and second scoops for reciprocating vertical movement along the length of the scoops when in the open position;

(d) biasing means engaging the slide rod for normally urging the inner scraper upwardly into a storage position adjacent a top end of the scoops; and (e) an outer scraper secured to said inner scraper and residing in closely-spaced relation to an outside surface of the scoops, said outer scraper being movable in unison with said inner scraper to clean away accumulated earthen matter from inside and outside surfaces of the scoops in the open position.

* * * * *